United States Patent [19]

Sun

[11] 4,401,633
[45] Aug. 30, 1983

[54] TWO STEP PROCESS FOR THE PREPARATION OF ZEOLITE A BY HYDROTHERMAL TREATMENT OF HEULANDITE

[75] Inventor: Hsiang-ning Sun, Media, Pa.

[73] Assignee: Atlantic Richfield Company, Los Angeles, Calif.

[21] Appl. No.: 343,647

[22] Filed: Jan. 28, 1982

[51] Int. Cl.$^3$ ............................................. C01B 33/28
[52] U.S. Cl. .................................. 423/118; 423/328; 423/329
[58] Field of Search ........................ 423/118, 328–330; 252/455 Z

[56] References Cited

U.S. PATENT DOCUMENTS 3,733,390  5/1973  Robson ............................. 423/118
4,247,524  1/1981  Leonard ............................ 423/118
4,310,496  1/1982  Achenbach et al. ................ 423/118

FOREIGN PATENT DOCUMENTS 667751  7/1963  Canada ............................. 423/118

OTHER PUBLICATIONS

Chen et al., "Natural Zeolites", Pergamon Press, 1978, pp. 411–420.
Robson, "Molecular Sieves—II", ACS Symposium Series 40, 1977, pp. 233–243.

Primary Examiner—Edward J. Meros
Attorney, Agent, or Firm—Delbert E. McCaslin

[57] ABSTRACT

A two step hydrothermal process for the preparation of a sodium cation form of zeolite A from heulandite by (1) heat treating a mixture of heulandite in an aqueous solution of sodium hydroxide and filtering the mixture followed by (2) reacting the filtrate with at least 75 percent of a stoichiometric amount of sodium aluminate to form and precipitate zeolite A from solution and recovering zeolite A.

12 Claims, No Drawings

TWO STEP PROCESS FOR THE PREPARATION OF ZEOLITE A BY HYDROTHERMAL TREATMENT OF HEULANDITE

BACKGROUND OF THE INVENTION

Zeolites or molecular sieves are three-dimensional crystalline alumina-silicates with internal pore structure having both cation exchange capacity and adsorption capacity. The cation exchange capacity of zeolites is related to the aluminum content and pore size, the aluminum atom carrying a unit negative charge in the crystalline framework and thus determining the cation exchange capacity. If the hydrated radius of a cation is too large for diffusion through the pores, then exchange capacity and rate for that cation will be low. The adsorption capacity of zeolites is related to the pore size and the size of the adsorbate molecule. Materials which can be diffused into the pores will be adsorbed while larger ones will not.

Zeolites may be synthesized from concentrated silica-alumina gels under basic conditions such as described in U.S. Pat. No. 2,882,243. According to U.S. Pat. No. 3,663,165, a zeolite molecular sieve catalyst has been synthesized from kaolin clay by calcining the kaolin at 1800° F. for 2 hours to form m-kaolin followed by two treatments with aqueous sodium hydroxide. The first treatment is carried out at 100° F. for 12 hours while the second is carried out at 180° F. for 12 hours.

U.S. Pat. No. 4,271,130 also describes a process for the preparation of Zeolite A from kaolin by converting the kaolin to meta-kaolin by flash heating at specific residence times and annealing in the presence of alkaline earth compounds, an uncolored halide or halogen and an alkali metal compound and reacting the meta-kaolin in an aqueous alkaline medium.

Certain natural zeolites do occur as mineral deposits in certain parts of the world. These mineral zeolites are usually found with varying amounts of other impurities and generally have low aluminum content. A natural mineral or natural zeolite is heulandite having the formula $Ca_{\frac{1}{2}x}(AlO_2)_x(SiO_2)_y \cdot ZH_2O$ wherein $x=5$ to 9, $x/y=2.5$ to 4.0 and $Z=1$ to 30.

A process for the preparation of zeolite A by hydrothermal treatment of clinoptilolite having the formula $Na_6(AlO_2)_6(SiO_2)_{30} \cdot 24H_2O$ in a slurry of sodium aluminate and aqueous sodium hydroxide is described in J. J. Leonard, U.S. Pat. No. 4,247,524. Due to the fact that natural clinoptilolite contains varying amounts of elemental impurities which are either insoluble under such reaction conditions or are exchangable with the sodium form of the zeolite A product an undesirable off-white product having a low cation exchange capacity will usually result. In addition, control of the zeolite A particle size is difficult.

Heulandite is one of the natural mineral zeolites of a group of hydrous alkali and/or alkaline earth alumino-silicates which have an open three-dimensional crystalline framework. The chemical and physical properties of heulandite, as well as of zeolite A, is described in Breck, Zeolite Molecular Sieves (1974) and other publications. The geologic occurence of natural mineral zeolites and some industrial and agricultural uses of zeolites in general are given. Zeolites including the zeolite A prepared by the instant process may be employed in various catalyst and adsorption systems.

It is a principle object of this invention to provide an improved process which produces a sodium cation form of zeolite A from heulandite in high yield and of superior quality including color and particle size distribution.

SUMMARY OF THE INVENTION

The present invention relates to an improved method for the preparation of a high quality zeolite A of the sodium (Na) cation form which has the general formula $Na_x(AlO_2)_x(SiO_2)_y \cdot ZH_2O$ wherein $x=10$ to 14, $y/x=0.8$ to 1.2 and $Z=1$ to 30 which comprises a two step hydrothermal treatment of natural heulandite having the general formula $Ca_{\frac{1}{2}x}(AlO_2)_x(SiO_2)_y \cdot ZH_2O$ wherein $x=5$ to 9, $y/x=2.5$ to 4.0 and $Z=1$ to 30. In the first step, the heulandite is heat treated in an aqueous solution of sodium hydroxide. The heulandite-sodium hydroxide mixture is then filtered and the filtrate reacted with at least 75 percent of a stoichiometric amount of sodium aluminate ($NaAlO_2$ or $Na_2Al_2O_4$) in water to form a sodium cation form of zeolite A which precipitates out of the solution.

DETAILED DESCRIPTION OF THE INVENTION

In accordance with the present invention a sodium cation form of zeolite A is prepared from natural heulandite by a novel two step hydrothermal process which comprises (1) heating the natural heulandite in an aqueous sodium hydroxide solution for a period of time to dissolve heulandite and filtering to remove undissolved material, including undissolved heulandite elemental impurities, and insoluble calcium compounds, such as calcium hydroxide formed from the heulandite and precipitated in the sodium hydroxide heated solution and form a filtrate which is (2) reacted by heating with at least 75 percent of a stoichiometric amount of sodium aluminate in aqueous solution for a period of time to precipitate and form a sodium cation form of zeolite A which may be recovered by filtration of the mixture followed by water wash and drying.

The temperature of heating the heulandite-sodium hydroxide solution as well as the filtrate-sodium aluminate solution may range from about 60° C. to 110° C. and is preferably from 90° C. to 100° C. Both reactions may also be carried out at temperatures above 110° C. under pressure. The time of heating in both steps will be dependent on the choice of temperature and the ratio of reactants. Generally the time will range from 15 minutes to 4 hours and preferred conditions involve a time of from 15 minutes to 1 hour.

In the first heating step the sodium hydroxide concentration in water ranges from about 1 percent to 30 percent, preferably 10 percent to 20 percent by weight with the concentration of heulandite being at least one gram of heulandite per 100 cc of sodium hydroxide solution. The upper limit of heulandite present in the sodium hydroxide solution is not critical. However, the amount present should not be such as to afford an unworkable viscosity or prevent reasonable dissolution of the heulandite. Generally the heulandite concentration in aqueous sodium hydroxide will range from 4 to 16 grams of heulandite per 100 cc of sodium hydroxide solution. The heulandite-sodium hydroxide hydrothermal treated solution is centrifuged or filtered by any conventional means at reaction temperature or less (room temperature) to remove undissolved material and produce a filtrate to be reacted with aqueous sodium aluminate.

In the second heating step the filtrate from the first step, as determined by the silica-alumina ratio thereof, is reacted with at least 75 percent of a stoichiometric quantity preferably a stoichiometric amount of sodium aluminate in aqueous solution, for zeolite A formation. Less than 75 percent of the stoichiometric amount of sodium aluminate will not give a good yield of zeolite A. The Si:Al ratio of the filtrate as determined by atomic adsorption will be between a 1:1 Si:Al ratio (zeolite A) and a 3.5:1 Si:Al ratio (heulandite). In general the filtrate will have a 2.7:1 Si:Al content. The amount of sodium aluminate present in aqueous solution may range between about 1 and 16.5 percent (an approximate saturated solution) by weight and is preferably from 4 to 15 percent by weight.

It has also been determined that sodium chloride in amounts of from 0 to 15 weight percent, based on the aqueous NaOH solution or the aqueous sodium aluminate solution may optionally be added during the first and/or second hydrothermal treatment step to increase the rate of reaction in preparing the zeolite A in the second hydrothermal step and thus, allow the employment of smaller reactors. Addition of the NaCl will generally give small quantities of sodalite in the product. In addition, 0 to 30 weight percent sodium hydroxide, based on the aqueous sodium aluminate solution, may be added in the second step to increase the aqueous sodium aluminate solubility rate and to maintain an NaOH concentration with a desired range to provide for recycle, after forming and recovery of zeolite A, of the aqueous solution to the first stage hydrothermal treatment with the addition of fresh heulandite.

Once zeolite A has been formed which may be determined by x-ray diffraction studies, the precipitated zeolite A may be recovered by means such as filtration. Subsequently, the zeolite A may be water washed and then dried. Drying may be carried out at room temperature or at elevated temperatures. The zeolite A produced by the instant process is in a white crystalline form. It has a good cation exchange capacity and a mean particle size in the 3 to 6 micron range.

The following examples to illustrate the invention in accordance with the principles of this invention but are not to be considered as limiting the invention in any way except as indicated by the appended claims.

EXAMPLE 1

(Step 1) A solution of 10 percent by weight of NaOH was prepared by dissolving 100 g. of NaOH in 900 g. of water. 300 cc of this solution was introduced into a 500 cc round bottom flask with a mechanical stirrer and thermometer. 12.0 g. of heulandite was added and the mixture heated in an oil bath at 80° C. for 2 hours. The hot mixture was then filtered to give a filtrate and leave 5.9 g. of residue upon air drying at 25° C.

(Step 2) 250 cc of the hot filtrate from Step 1 was recharged into the reactor, and 40 cc of 15 weight percent $NaAl(OH)_4$ was added. A precipitate is formed immediately. The mixture was heated at 80° C. for two hours, 7.9 g. of zeolite A product was recovered by filtration of the hot mixture followed by a water wash and air drying at 25° C. X-ray diffraction and elemental analysis showed the product was zeolite A. The product was white and had a cation exchange capacity of 6.04 meq $Ca^{++}$ per gram of anhydrous zeolite. It had a mean particle size of 4.7 microns.

EXAMPLE 2

The above example was repeated at 95° C. In the first step, after 1 hour 6.1 g. of residue was obtained. In the second step, after 1 hour at 95° C., 7.1 g. of zeolite A, containing a trace of sodalite was obtained. The mean particle size was 4.9 microns.

EXAMPLES 3 to 7

In Examples 3 to 7 which follow in Table form, the procedures of Example 1, steps 1 and 2, were followed employing varying amounts of sodium hydroxide and heulandite (heul.) as well as sodium aluminate and reaction conditions. The results are set forth in Table 1 below. The product was determined by x-ray diffraction and elemental analysis.

TABLE I

| | Step 1 | | | | Step 2 | | | |
|---|---|---|---|---|---|---|---|---|
| | | Heul. | | | | | | |
| Ex. No. | % NaOH | g./cc. of NaOH solu. | Time (min.) | Temp. (°C.) | % NaOH | Temp. (°C.) | Time (min.) | Product[b] |
| 3 | 30 | .125 | 60 | 80 | 0 | 80 | 60 | A |
| 4 | 20[a] | .10 | 30 | 95 | 20 | 85 | 30 | A + trace S |
| 5 | 20 | .05 | 30 | 85 | 20[a] | 95 | 30 | A + trace S |
| 6 | 15 | .10 | 45 | 95 | 0 | 95 | 45 | A |
| 7 | 15 | .05 | 30 | 100 | 15 | 100 | 40 | A |

[a]contains 2 percent NaCl
[b]A = zeolite A
S = sodalite

I claim:

1. A hydrothermal process for the preparation of a sodium cation form of zeolite A from natural heulandite of the formula $$Ca\tfrac{1}{2}x(AlO_2)_x(SiO_2)_y.ZH_2O$$

wherein x=5 to 7, y/x=4.5 to 5.5 and z=1 to 30 which comprises the steps of:
  (a) heating at a temperature of from about 60° C. to 110° C. said natural heulandite in a 1 to 30 weight percent aqueous solution of sodium hydroxide to dissolve heulandite, the heulandite having a concentration of at least one gram heulandite per 100 cc of aqueous sodium hydroxide solution;
  (b) filtering the heulandite-sodium hydroxide solution to remove undissolved heulandite and elemental impurities and form a filtrate;
  (c) reacting the filtrate at a temperature of from about 60° C. to 110° C. in the presence of up to 15 weight percent of NaCl with at least 75 percent of a stoichiometric amount of sodium aluminate in an aqueous solution to precipitate and form zeolite A having a mean particle size of about 3 to 6 microns, said sodium aluminate having a concentration of from 1 to 16.5 weight percent in water; and recovering said zeolite A.

2. A process according to claim 1 wherein the aqueous sodium hydroxide solution is in the range of from 10 to 20 percent by weight.

3. A process according to claim 1 wherein the concentration of heulandite is from 4 to 16 g. per 100 cc of aqueous sodium hydroxide solution.

4. A process according to claim 1 wherein the temperature of heating in step (a) and reacting the filtrate in step (c) is from 90° to 100° C.

5. A process according to claim 1 wherein the heating in step (a) and reacting the filtrate in step (c) are carried out at a temperature of from 110° C. to 150° C. under pressure.

6. The process according to claim 1 wherein the heating in step (a) and reacting the filtrate in step (c) are carried out for from 15 minutes to 4 hours.

7. The process of claim 6 wherein the time is from 15 minutes to 1 hour.

8. A process according to claim 1 wherein a stoichiometric amount of sodium aluminate in aqueous solution is employed.

9. A process according to claim 1 wherein said sodium aluminate concentration in water is from 4 to 15 percent by weight.

10. A process according to claim 1 wherein the NaCl based on the aqueous sodium hydroxide solution is added in step (a).

11. A process according to claim 1 wherein the NaCl based on the sodium aluminate aqueous solution is added in step (c).

12. A process according to claim 1 wherein from 0 to 30 weight percent sodium hydroxide based on the aqueous sodium aluminate solution is added in step (c).

* * * * *